(12) United States Patent
Yamada et al.

(10) Patent No.: US 8,504,327 B2
(45) Date of Patent: Aug. 6, 2013

(54) DETECTING METHOD AND DETECTING APPARATUS

(75) Inventors: Hideaki Yamada, Shimo-Suwa-machi (JP); Michihiro Nagaishi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 387 days.

(21) Appl. No.: 12/909,784

(22) Filed: Oct. 21, 2010

(65) Prior Publication Data

US 2011/0098979 A1 Apr. 28, 2011

(30) Foreign Application Priority Data

Oct. 23, 2009 (JP) ................................. 2009-244203

(51) Int. Cl.
*G01D 1/00* (2006.01)
*G01D 21/00* (2006.01)
*G06F 17/40* (2006.01)
*G06F 19/00* (2011.01)

(52) U.S. Cl.
USPC .............. 702/189; 73/865.8; 702/1; 702/127; 702/187

(58) Field of Classification Search
USPC ...................... 73/432.1, 865.8; 324/72, 76.11, 324/102, 113, 500, 540, 635, 653; 361/1, 361/78, 86, 88, 89, 92; 700/1, 28, 32, 33, 700/90, 306; 702/1, 85, 104, 127, 182, 183, 702/184, 185, 187, 189; 708/100, 105, 200, 708/290; 713/300, 320, 321, 324; 714/1, 714/2, 3, 100; 340/500, 540, 635, 653

IPC ......... G01D 1/00,1/18, 3/00, 3/08, 21/00; G06F 11/00, 11/32, 17/00, 17/40, 19/00
See application file for complete search history.

(56) References Cited

U.S. PATENT DOCUMENTS

| 2,767,914 | A | * | 10/1956 | Merrill et al. | 702/82 |
|---|---|---|---|---|---|
| 2,878,999 | A | * | 3/1959 | Lindsey et al. | 708/842 |
| 3,034,055 | A | * | 5/1962 | Fine et al. | 324/102 |
| 3,401,395 | A | * | 9/1968 | Neher | 360/5 |
| 3,412,240 | A | * | 11/1968 | Dell et al. | 708/290 |
| 3,521,270 | A | * | 7/1970 | Heitmann et al. | 708/290 |
| 3,532,864 | A | * | 10/1970 | Dertouzos | 708/290 |
| 4,555,765 | A | * | 11/1985 | Crooke et al. | 702/89 |
| 6,741,199 | B2 | * | 5/2004 | Gartner et al. | 341/158 |
| 7,233,884 | B2 | * | 6/2007 | Volponi | 702/189 |
| 2003/0107510 | A1 | * | 6/2003 | Gartner et al. | 341/158 |
| 2004/0153815 | A1 | * | 8/2004 | Volponi | 714/37 |

FOREIGN PATENT DOCUMENTS

| JP | 11-118587 A | | 4/1999 |
|---|---|---|---|
| JP | 2007-194813 A | | 8/2007 |
| JP | 2011-89910 A | * | 5/2011 |

* cited by examiner

*Primary Examiner* — Edward Cosimano
(74) *Attorney, Agent, or Firm* — Kilpatrick Townsend & Stockton LLP

(57) ABSTRACT

A detecting method employing a first sensor and a second sensor, includes: first processing for detecting, on the basis of an output value of the first sensor, a predetermined state defined in advance; second processing for starting the second sensor according to the detection of the predetermined state; and third processing for generating interpolation data from an output value of the first sensor in a predetermined time until the second sensor becomes capable of outputting a measurement value after being started.

5 Claims, 5 Drawing Sheets

FIG. 7

| STARTING CONDITIONS | | | | SECOND SENSORS | | | |
|---|---|---|---|---|---|---|---|
| INDEX VALUE | | | ROTATION ANGLE | GPS | GYRO SENSOR | ACCELERATION SENSOR | DIRECTION SENSOR |
| BALL SENSOR A | BALL SENSOR B | BALL SENSOR C | | | | | |
| 3 | 3 | 0 | — | | ON | | ON |
| 3 | 0 | 3 | — | | ON | | ON |
| 3 | 0 | 0 | — | | ON | | ON |
| 3 | 3 | 1~3 | — | ON | ON | | ON |
| 3 | 1~3 | 3 | — | ON | ON | | ON |
| 2 | 0~2 | 0~2 | — | | ON | ON | ON |
| 2 | 3 | 1 | — | ON | ON | ON | ON |
| 2 | 0~1 | 3 | — | ON | ON | ON | ON |
| 1 | 3 | 0~1 | — | | | ON | ON |
| 1 | 1 | 3 | — | ON | | ON | ON |
| 0 | 0~2 | 0~2 | — | | | ON | ON |
| 0 | 3 | 1 | — | ON | | ON | ON |
| 0 | 1 | 3 | — | ON | | ON | ON |

CASE 1, CASE 2, CASE 3 correspond to the first three rows.

DETECTING METHOD AND DETECTING APPARATUS

BACKGROUND

1. Technical Field

The present invention relates to a detecting method for controlling plural sensors and a detecting apparatus employing the detecting method.

2. Related Art

In the related art, for detection of positions, directions, and moving speeds of moving objects, impacts on the moving objects, and the like such as movements of humans, animals, and objects, sensors such as a GPS (Global Positioning System), a magnetic direction sensor, a gyro sensor, and an acceleration sensor are used. In some case, these sensors are independently used and, in other cases, plural sensors are used in combination.

Although the sensors can accurately detect movements, electric power needs to be always supplied to the sensors. Therefore, as the number of sensors increases, more accurate state detection can be performed and, on the other hand, consumed electric power increases. Consequently, when the continuous supply of electric power cannot be performed, contrivances are made to, for example, limit time in which the sensors are used and reduce the number of sensors always in use.

For example, JP-A-11-118587 proposes a vibration detecting apparatus including: a contact-type vibration detecting unit that does not need to be always energized; an electric vibration detecting unit; a monitoring unit that monitors an output signal of the contact-type vibration detecting unit; and an operation control unit that enables the operation of the electric vibration detecting unit on the basis of a monitoring result of the monitoring unit.

The detecting apparatus disclosed in JP-A-11-118587 detects a change in an inclined state in which the detecting apparatus is set and performs control of ON and OFF of a power supply for the electric vibration detecting unit. However, even if large vibration occurs within time until the electric vibration detecting unit stably operates after being turned on, the detecting apparatus cannot detect the vibration.

SUMMARY

An advantage of some aspects of the invention is to solve at least a part of the problem mentioned above and the invention can be implemented as a detecting method and a detecting apparatus of embodiments or application examples explained below.

APPLICATION EXAMPLE 1

According to this application example of the invention, there is provided a detecting method employing a first sensor and a second sensor, the detecting method including: first processing for detecting, on the basis of an output value of the first sensor, a predetermined state defined in advance; second processing for starting the second sensor according to the detection of the predetermined state; and third processing for generating interpolation data from an output value of the first sensor in a predetermined time until the second sensor becomes capable of outputting a measurement value after being started.

With this method, in the first processing, the predetermined state defined in advance is detected according to an output value of the first sensor. When the predetermined state is detected, in the second processing, the second sensor is started. In the time until the second sensor becomes capable of outputting a measurement result after being started, in the third processing, interpolation data replacing a measurement value of the second sensor is generated on the basis of the output value of the first sensor. This makes it possible to configure a detecting device having high responsiveness with power consumption suppressed. A sensor with power consumption smaller than that of the second sensor is used as the first sensor. A sensor with detection accuracy higher than that of the first sensor is used as the second sensor. Consequently, since the second sensor is not caused to always operate, power consumption can be suppressed. When a predetermined time is required until the second sensor becomes capable of outputting a measurement value after being started, interpolation data based on an output of the first sensor is generated. Therefore, a system including a detecting apparatus employing the method according to the aspect can more quickly execute necessary processing using the interpolation data.

APPLICATION EXAMPLE 2

In the detecting method of the above application example, it is preferred that the first sensor is a sensor that outputs a state of ON or OFF. The interpolation data may be calculated on the basis of a percentage of time in which the first sensor outputs a state of ON or OFF in the predetermined time.

With this method, since the sensor that outputs a state of ON or OFF is used as the first sensor, power consumption can be reduced. Interpolation data can be generated from a percentage of time in which the first sensor outputs the state of ON or OFF in the predetermined time. For example, as a sensor with small power consumption that consumes electric power only when the sensor is ON, a ball sensor having a spherical conductor between a pair of opposed electrodes is known. The ball sensor can be used in an apparatus employing the detecting method according to the aspect.

APPLICATION EXAMPLE 3

In the detecting method of the above application example, it is preferred that the predetermined state is defined according to output values of a plurality of the first sensors.

With the method, since plural sensors are used as the first sensor, the predetermined state can be more finely defined.

APPLICATION EXAMPLE 4

In the detecting method of the above application example, it is preferred that the second processing is processing for starting at least one of a plurality of the second sensors.

With the method, since plural sensors are used as the second sensor, a sensor suitable for use can be selected according to a detection result of the predetermined state. The plural sensors may be sensors of types different from one another. Since the plural sensors can be selected, a state can be more finely detected by combining measurement values of the selected sensors.

APPLICATION EXAMPLE 5

According to this application example of the invention, there is provided a detecting apparatus including a first sensor and a second sensor, the detecting apparatus including: a first control unit that performs, according to an output value of the first sensor, state detection of a predetermined state defined in advance; a second control unit that starts the second sensor according to a result of the state detection in the first control unit; and a third control unit that generates interpolation data from output values of a plurality of the first sensors in time until the second sensor becomes capable of outputting a measurement value after being started.

With this configuration, the first control unit detects the predetermined state defined in advance according to an output value of the first sensor. When the predetermined state is detected, the second control unit starts the second sensor. In the time until the second sensor becomes capable of outputting a measurement result after being started, the third control unit generates interpolation data replacing a measurement value of the second sensor on the basis of the output value of the first sensor. This makes it possible to configure a detecting device having high responsiveness with power consumption suppressed. A sensor with power consumption smaller than that of the second sensor is used as the first sensor. A sensor with detection accuracy higher than that of the first sensor is used as the second sensor. Consequently, since the second sensor is not caused to always operate, power consumption can be suppressed. When a predetermined time is required until the second sensor becomes capable of outputting a measurement value after being started, interpolation data based on an output of the first sensor is generated. Therefore, a system including the sensors according to the aspect can more quickly execute necessary processing using the interpolation data.

BRIEF DESCRIPTION OF THE DRAWINGS

The invention will be described with reference to the accompanying drawings, wherein like numbers reference like elements.

FIG. 7 is a list of starting conditions for a second sensor.

DESCRIPTION OF EXEMPLARY EMBODIMENTS

Exemplary embodiments of the invention are explained below with reference to the accompanying drawings.

First Embodiment

Figure 1:
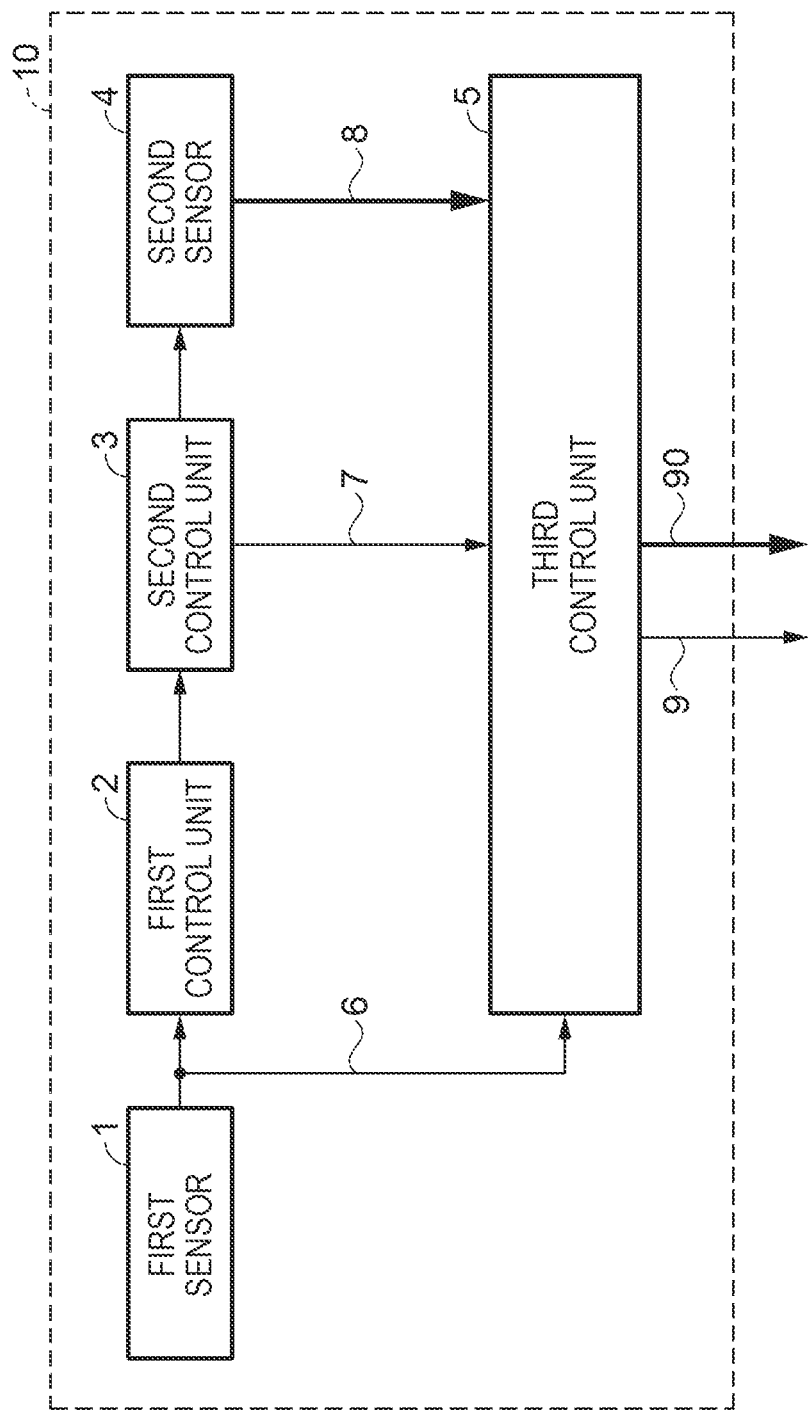
FIG. 1 is a block diagram of a detecting apparatus according to a first embodiment.

A block diagram of a detecting apparatus 10 according to a first embodiment is shown in FIG. 1. In FIG. 1, a first sensor 1, a first control unit 2, a second control unit 3, a second sensor 4, a third control unit 5, an output signal 6 of the first sensor 1, a control signal 7 from the second control unit 3 indicating that the second sensor 4 is started, an output signal 8 of the second sensor 4, a measurement value 90 of the detecting apparatus 10, and a control signal 9 indicating that the measurement value 90 is interpolation data are shown.

The first sensor 1 is a sensor that is always operating. The first sensor 1 may be a sensor with detection accuracy lower than that of the second sensor 4 that is caused to operate only when necessary. Instead, the first sensor 1 needs to be a sensor with power consumption that is small compared with that of the second sensor 4. The first sensor 1 is desirably a sensor that is simple in structure compared with the second sensor 4 and quickly responds to movement of a target attached with the detecting apparatus 10.

The first control unit 2 always monitors whether the output signal 6 of the first sensor 1 indicates a predetermined state. Since the first control unit 2 is caused to always operate, the first control unit 2 desirably has structure with small power consumption. For example, the first control unit 2 may set a voltage value as a boundary condition for ON and OFF of the output signal 6 and detect a change from ON to OFF or OFF to ON. Such a first control unit 2 can also be configured by a combination of a switch for setting the change from ON to OFF or OFF to ON as a detection target and plural resistance elements. When more complicated state detection is performed, a microcomputer or the like may be used as the first control unit 2. A result of the detection of the predetermined state performed by the first control unit 2 is transmitted to the second control unit 3.

The second control unit 3 receives the detection result from the first control unit 2, starts the second sensor 4, and informs, with the control signal 7, the third control unit 5 that the second sensor 4 is started. The third control unit 5 receives the control signal 7, creates interpolation data from the output signal 6 of the first sensor 1, and outputs the interpolation data as the measurement value 90 of the detecting apparatus 10. After the elapse of a predetermined time, the third control unit 5 switches the interpolation data to the output signal 8 of the second sensor 4 and outputs the output signal 8 as the measurement value 90. The predetermined time is time until the second sensor 4 becomes capable of outputting a stable measurement value as the output signal 8.

The control signal 9 is a signal for distinguishing whether the measurement value 90 is the interpolation data or the measurement result (the output signal 8) of the second sensor 4. This signal is provided to enable an apparatus as a host of the detecting apparatus 10 to distinguish whether the measurement value 90 is the interpolation data or the measurement result (the output signal 8) of the second sensor 4.

Example 1

An example 1 is an example in which the ball sensor is used as the first sensor 1 and an acceleration sensor is used as the second sensor 4. The ball sensor is a sensor in which a movable spherical conductor is placed in a space formed by a pair of electrodes opposed to each other at a predetermined interval. The pair of electrodes change to an energized state or a non-energized state according to a position of the spherical conductor. The ball sensor outputs this state. Since the ball sensor consumes electric power when the pair of electrodes are in the energized state, power consumption of the ball sensor can be reduced compared with sensors of other types. The shape of the ball sensor is not specifically shown in the figure. In this example, the pair of electrodes are set to be in the non-energized state when the ball sensor is at a standstill.

A condition for the first control unit 2 to start the second sensor 4 (the predetermined state) is defined by an index value calculated according to a percentage of an energization time in unit time of the first sensor 1. The index value is 0 when the percentage of the energization time is 0%. The index value is 1 when the percentage of the energization time is smaller than 50% and is not 0%. The index value is 2 when the percentage of the energization time is equal to or larger than 50% and smaller than 100%. The index value is 3 when the percentage of the energization time is 100%. Under a condition of this degree, the first control unit 2 can be configured if there are circuits such as a differentiating circuit, a timer circuit, a counter circuit, and a comparing circuit for the output signal 6.

Figure 2:
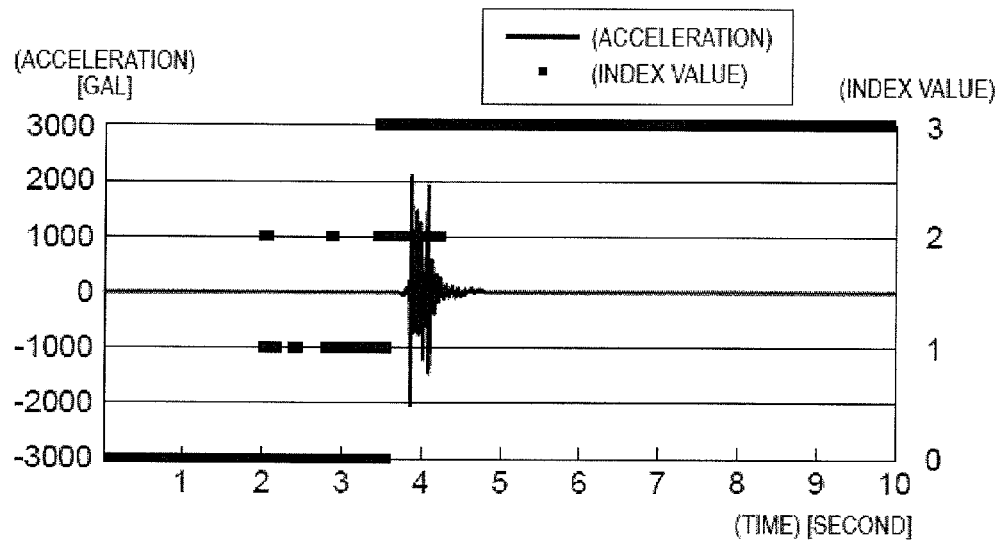
FIG. 2 is an example of detection states of a first sensor and a second sensor.

The acceleration sensor used in this example requires about one second until the acceleration sensor outputs a measurement value after being started and requires about one second until the acceleration sensor outputs a usable measurement value. In FIG. 2, a change in the index value of the first sensor 1 and a change in an output value of the detecting apparatus 10 that occurs when an output of interpolation data is masked by using the control signal 9 (the interpolation data is not output). As it is seen from FIG. 2, when the interpolation data is not used, other apparatuses cannot be controlled by using an output value of the detecting apparatus 10 for about two seconds after the first sensor 1 detects a change in a state. In FIG. 2, it looks as if plural index values are present at the same time. However, this is because the index values are shown in the figure while being compressed in the lateral direction. Actually, only one index value is present at the same time.

Figure 3:
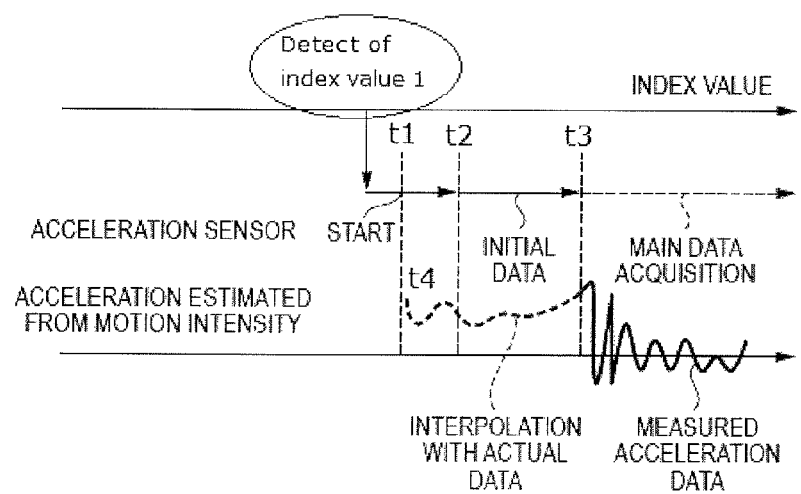
FIG. 3 is an example of detection states of a first sensor and a second sensor and interpolation data.

A state of a change in a measurement value 90 of the detecting device 10 including the interpolation data is shown in FIG. 3. The first control unit 2 detects an index value 1 according to the output signal 6 of the first sensor 1. As a result, in t1 in FIG. 3, the second control unit 3 starts the second sensor 4. Although the second sensor 4 starts output in t2 in FIG. 3, the second sensor 4 cannot output an accurate measurement result as the output signal 8 until t3 in FIG. 3. However, as shown in FIG. 3, in this example, from t4 to t3 in FIG. 3, the second sensor 4 outputs the measurement value 90 of the detecting apparatus 10 by outputting the interpolation data. Consequently, an apparatus that uses a measurement value of the detecting apparatus 10 can start the control of the apparatus earlier.

Generation of the interpolation data is performed according to a formula described below. First, a total energization time per unit time T0 is calculated by Formula (1). An index value [L(T0)] is calculated according to the criteria explained above. M(t) indicates an energization time obtained from the output signal 6 of the first sensor 1. In this example, T0 is set to 2.5 ms. Acceleration at the unit time T1 is calculated by Formula (2). k indicates a proportionality constant. T1 is set to 25 ms. In this example, acceleration is calculated from ten index values [L(T0)].

$$\text{Energization time} = \sum_{t=0}^{T0} M(t) \quad (1)$$

$$\text{Acceleration} = k \sum_{t=0}^{T1} \{L(T0)\}^2 \quad (2)$$

Second Embodiment

Figure 4:
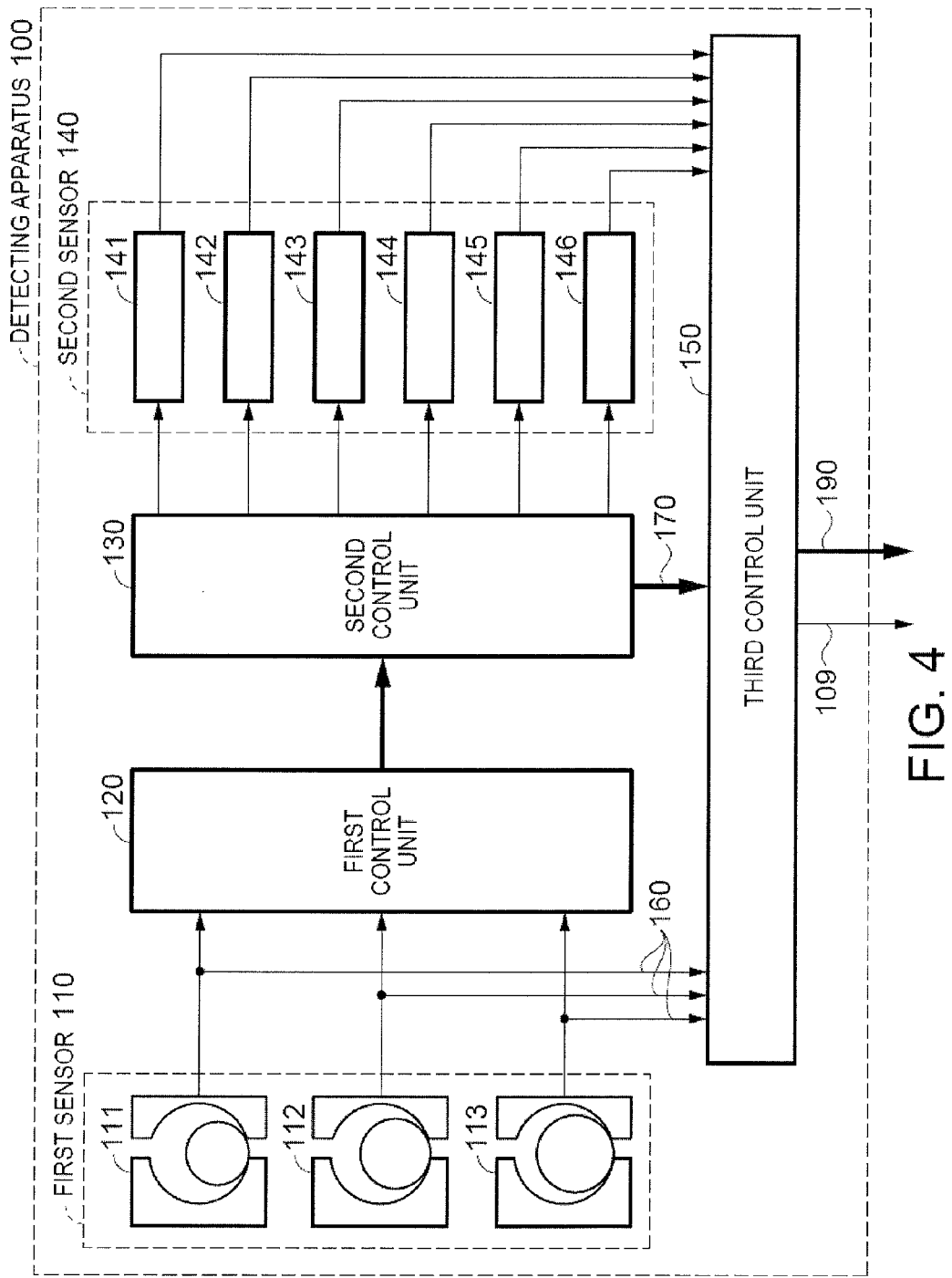
FIG. 4 is a block diagram of a detecting apparatus according to a second embodiment.

A block diagram of a detecting apparatus 100 according to a second embodiment is shown in FIG. 4. In this embodiment, plural sensors are used in each of a first sensor 110 and a second sensor 140. Since the plural sensors are used in the first sensor 110, it is possible to finely set conditions for starting the second sensor 140. Since the plural sensors are used in the second sensor 140, it is possible to start sensors, use of which can be determined as being appropriate. The first sensor 110 shown in FIG. 4 includes three sensors 111, 112, and 113 having different spherical portions on the insides. However, the sensors 111, 112, and 113 may be sensors of different forms or may be sensors of the same form. Similarly, in the second sensor 140, sensors 141, 142, 143, 144, 145, and 146 may be sensors of different forms or may be sensors of the same form. In both the first sensor 110 and the second sensor 140, when the sensors of the same form are used, for example, if setting directions of the respective sensors are set different or sensors having different accuracies are used as the sensors, information that can be determined by a host apparatus, which uses an output of the detecting apparatus 100, can be increased. When plural sensors of the same form having the same accuracy are arranged in the same setting direction, it is considered less likely that all the sensors stop operating simultaneously. Therefore, reliability against failures can be improved. In FIG. 4, the three sensors 111, 112, and 113 are shown as the first sensor 110. The six sensors 141, 142, 143, 144, 145, and 146 are shown as the second sensor 140. However, in this embodiment, the sensors are not limited to these numbers.

Example 2

In this example, three ball sensors are used as first sensors to respectively detect states of inclinations of three axes, an X axis, a Y axis, and a Z axis orthogonal to one another. At least one of plural second sensors is started according to conditions that can be recognized according to combinations of outputs of the three ball sensors. As the second sensors, a GPS, a gyro sensor, an acceleration sensor, and a direction sensor are used. In this example, the detecting apparatus 100 is attached to an object having a degree of freedom 4 that moves three-dimensionally and can rotate around the X axis.

Figure 5:
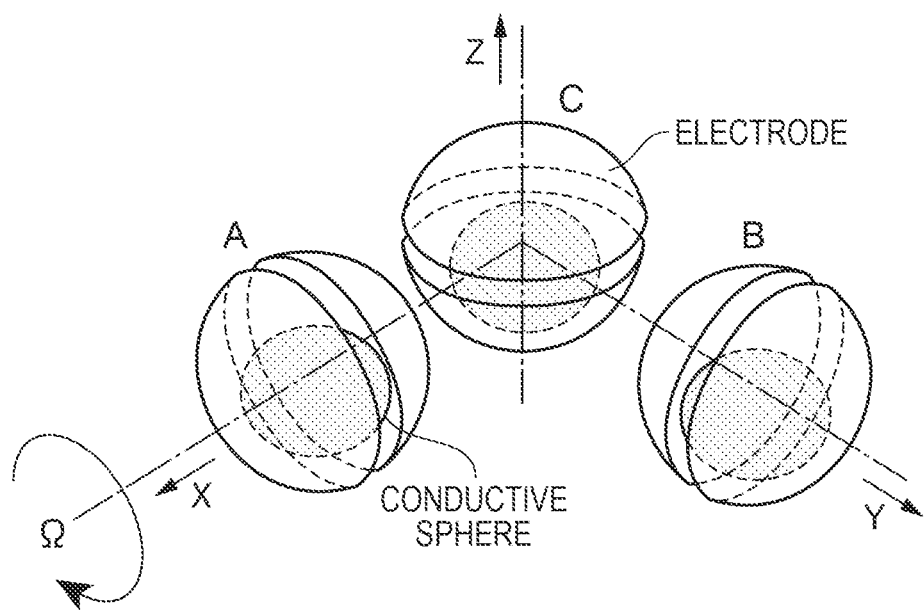
FIG. 5 is an example of arrangement of a first sensor.

An image of arrangement of the three ball sensors used as the first sensors is shown in FIG. 5. To facilitate imaging, in FIG. 5, for convenience of illustration, one ball sensor (a ball sensor C shown in FIG. 5) is arranged at an intersection (the origin) of the orthogonal three axes, one ball sensor (a ball sensor A shown in FIG. 5) is arranged on the X axis deviating from the origin, and one ball sensor (a ball sensor B shown in FIG. 5) is arranged on the Y axis deviating from the origin. Actually, if opposed ends of a pair of electrodes of each of the ball sensors arranged on a predetermined axis are perpendicular to the predetermined axis, the electrodes only have to be present on arbitrary axes parallel to the predetermined axis. For example, the respective ball sensors may be arranged on one straight line. In the detecting apparatus 100 in this example, the three ball sensors are arranged in a free area of a substrate (not shown) mounted with a first control unit 120, a second control unit 130, and a third control unit 150.

Figure 6:
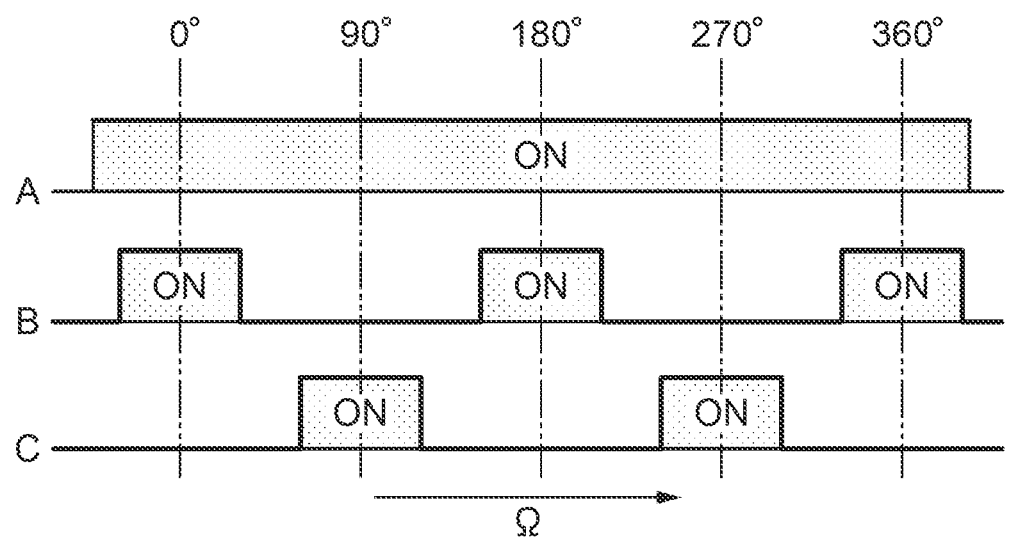
FIG. 6 is an example of detection states of the first sensor.

An example of detection states of ON and OFF of the ball sensors A, B, and C as the first sensors is shown in FIG. 6. Detection states of the ball sensors A, B, and C rotated around the X axis are shown in FIG. 6. At a rotation angle of 0° in FIG. 6, a plane including the X axis and the Y axis is horizontal. When the detecting apparatus 100 is rotated around the X axis, the ball sensor A is always ON. The ball sensor B transitions to ON when the rotation angle is around 0° (360°) and 180°. The ball sensor C transitions to ON when the rotation angle is around 90° and 270°. An angle at which the ball sensors transition from ON to OFF and an angle at which the ball sensors transition from OFF to ON according to the rotation depend on a distance between the opposed ends of the pair of electrodes in each of the ball sensors and a diameter of movable balls.

The ball sensors used in this example transition from ON to OFF when the inclination of the opposed ends of the pair of electrodes exceeds about 30° from the vertical state. The ball sensors transition to ON when the inclination decreases to be equal to or smaller than about 30°. Therefore, when a rotating direction is represented as Ω in FIGS. 5 and 6, a rotation angle at the time when the ball sensor B is ON (a case 1) is any one of 0 to about 30°, about 150° to about 210°, and about 330° to 360°. Similarly, a rotation angle at the time when the ball sensor C is ON (a case 2) is any one of about 60° to about 120° and about 240° to about 300°. A rotation angle at the time when both the ball sensors B and C are OFF (a case 3) is any one of about 30° to about 60°, about 120° to about 150°, about 210° to about 240°, and about 300° to about 330°. In FIGS. 5 and 6, for convenience of explanation, the rotating direction is represented as Ω. However, in this example, the rotating direction is unknown from output signals 160 of the ball sensors A, B, and C.

Conditions for starting the second sensors are a rotation angle of rotation around the X axis detected by the ball sensors B and C and an index value in unit time T0 detected by each of the ball sensors A, B, and C. As a method of calculating the index value, Formula (1) same as that in the example 1 is used.

A list of the conditions for starting the second sensors and sensors to be started is shown in FIG. 7. When the first control unit 120 detects the starting conditions shown in FIG. 7, the first control unit 120 outputs a detection result to the second control unit 130 and the second control unit 130 starts the second sensors according to the list shown in FIG. 7. The output signals 160 of the ball sensors A, B, and C indicate only an energized state and a non-energized state. Therefore, in a state in which the detecting apparatus 100 is at a standstill, a combination of index values generated from the output signals 160 of the ball sensors A, B, and C is any one of the cases 1, 2, and 3. Therefore, in a measuring period of the detecting apparatus 100, the start of processing for starting the second sensors is triggered when it is detected that an object mounted with the detecting apparatus 100 changes from a standstill state, i.e., a state of any one of the cases 1, 2, and 3 to the conditions for start shown in FIG. 7 different from the standstill state.

The stop of the operation of the second sensors is triggered when the object mounted with the detecting apparatus 100 changes to the standstill state again, i.e., the state of any one of the cases 1, 2, and 3. However, even if the object changes to the state of any one of the cases 1, 2, and 3, the object is not always at a standstill. Therefore, in this example, the second control unit 130 is imparted with a control function for disabling the operating of second sensors when the state of any one of the cases 1, 2, and 3 continues for a predetermined time (a different time is set according to a type of a sensor). Contents of FIG. 7 are explained below.

In this example, it may be considered that, even if the index values based on the output signals 160 of the ball sensors A, B, and C change, when the index values take only a value 3 or 0, only rotation with respect to the X axis occurs. In this example, in this case, the gyro sensor and the direction sensor only have to be started. The gyro sensor and the direction sensor are sensors that are started irrespectively of which of the starting conditions is satisfied.

When the index value 3 is present in at least one of the ball sensors A, B, and C besides the cases 1, 2, and 3, since it can be assumed that the position of the ball sensor substantially deviates, the GPS is started. When the index value 2 is present in none of the ball sensors A, B, and C besides the cases 1, 2, and 3, the acceleration sensor is not started.

The third control unit 150 receives, from the second control unit 130, a control signal 170 that means the start of the second sensors. When started sensors are the acceleration sensor and the gyro sensor, the third control unit 150 generates, for a predetermined time until the respective sensors become capable of outputting accurate measurement results, interpolation data to be output as measurement values of the acceleration sensor and the gyro sensor. As the interpolation data, acceleration is calculated for each of the ball sensors A, B, and C from Formula (2). While the calculated acceleration is output as a measurement value 190, a control signal 109 is set ON. A measurement value is output by the control signal 109 together with a tag indicating a type of a sensor.

In this example, the interpolation data of the acceleration sensor is a value obtained by adding up accelerations calculated from the output signals 160 of the ball sensors A, B, and C. As the interpolation data of the gyro sensor, values of the accelerations calculated from the output signals 160 of the ball sensors A, B, and C are directly output.

The several embodiments of the invention are explained above. Implementation of the invention is not limited to the embodiments and the examples. The proportionality coefficient of Formula (2) is desirably set when an actual experiment is performed. A form of the measurement value 190 is desirably defined according to a host apparatus that uses a measurement value.

The entire disclosure of Japanese Patent Application No. 2009-244203, filed Oct. 23, 2009 is expressly incorporated by reference herein.

What is claimed is:

1. A detecting method employing a first sensor and a second sensor, the detecting method comprising:
   first processing for detecting, on the basis of an output value of the first sensor, a predetermined state defined in advance;
   second processing for starting the second sensor according to the detection of the predetermined state; and
   third processing for generating interpolation data from an output value of the first sensor in a predetermined time until the second sensor becomes capable of outputting a measurement value after being started.

2. The detecting method according to claim 1, wherein the first sensor is a sensor that outputs a state of ON or OFF, and
   the interpolation data is calculated on the basis of a percentage of time in which the first sensor outputs a state of ON or OFF in the predetermined time.

3. The detecting method according to claim 1, wherein the predetermined state is defined according to output values of a plurality of the first sensors.

4. The detecting method according to claim 1, wherein the second processing is processing for starting at least one of a plurality of the second sensors.

5. A detecting apparatus including a first sensor and a second sensor, the detecting apparatus comprising:
   a first control unit that performs, according to an output value of the first sensor, state detection of a predetermined state defined in advance;
   a second control unit that starts the second sensor according to a result of the state detection in the first control unit; and
   a third control unit that generates interpolation data from output values of a plurality of the first sensors in a predetermined time until the second sensor becomes capable of outputting a measurement value after being started.

* * * * *